(12) United States Patent
Abe et al.

(10) Patent No.: US 11,976,933 B2
(45) Date of Patent: May 7, 2024

(54) WALKING ROUTE DETERMINATION DEVICE, WALKING ROUTE DETERMINATION METHOD, AND WALKING ROUTE DETERMINATION PROGRAM

(71) Applicant: NIPPON TELEGRAPH AND TELEPHONE CORPORATION, Tokyo (JP)

(72) Inventors: Hirofumi Abe, Tokyo (JP); Keihiro Ochiai, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 133 days.

(21) Appl. No.: 17/617,984

(22) PCT Filed: Jun. 11, 2019

(86) PCT No.: PCT/JP2019/023150
§ 371 (c)(1),
(2) Date: Dec. 10, 2021

(87) PCT Pub. No.: WO2020/250311
PCT Pub. Date: Dec. 17, 2020

(65) Prior Publication Data
US 2022/0260383 A1      Aug. 18, 2022

(51) Int. Cl.
*G01C 21/36* (2006.01)
*G01C 21/32* (2006.01)
(Continued)

(52) U.S. Cl.
CPC .......... *G01C 21/367* (2013.01); *G01C 21/32* (2013.01); *G01C 21/362* (2013.01);
(Continued)

(58) Field of Classification Search
None
See application file for complete search history.

(56) References Cited

FOREIGN PATENT DOCUMENTS

| JP | 2009294153 A | * | 12/2009 |
| JP | 5895365 B2 | * | 3/2016 |

OTHER PUBLICATIONS

Toya, Pedestrian terminal device, computer program, and walking route search method, 2012; NPL attacehd (Year: 2016).*

(Continued)

*Primary Examiner* — James M McPherson
*Assistant Examiner* — Bakari Underwood

(57) ABSTRACT

A link combination extraction unit (24) acquires all the combination of link candidates from among link candidates having an angle with respect to a movement direction of a pedestrian equal to or smaller than a threshold value among link candidates for n walking route networks. The link combination extraction unit (24) acquires all the combinations of link candidates that do not intersect with each other among the acquired combinations of link candidates. The link combination extraction unit (24) acquires all the combinations of link candidates that do not connect to each other among the acquired combinations of link candidates. The link combination extraction unit (24) acquires all the combinations of link candidates that are not on the same straight line among the acquired combinations of link candidates. A candidate determination unit (26) acquires a combination of link candidates closest to position information of a pedestrian when there are a plurality of acquired link candidates.

11 Claims, 14 Drawing Sheets

(51) Int. Cl.
  *G01S 19/39* (2010.01)
  *G01S 19/40* (2010.01)
  *G01S 19/42* (2010.01)
  *H04W 4/02* (2018.01)
  *H04W 4/024* (2018.01)

(52) U.S. Cl.
  CPC ............ *G01S 19/393* (2019.08); *G01S 19/40* (2013.01); *G01S 19/42* (2013.01); *H04W 4/024* (2018.02); *H04W 4/025* (2013.01)

(56) References Cited

OTHER PUBLICATIONS

Kei Hiroo, Route searching device, route searching method, route searching program, and map data; NPL attached (Year: 2009).*
Abe et al. (2018) "An identification method of pedestrian's walking path under Urban Canyon" Proceedings of the 2018 Winter Games of the Institute of Image Information and Television Engineers, Dec. 6, 2018.

* cited by examiner

MOVEMENT DIRECTION

— · — ROUTE THAT MAY BE ERRONEOUSLY DETERMINED

WALKING ROUTE DETERMINATION DEVICE, WALKING ROUTE DETERMINATION METHOD, AND WALKING ROUTE DETERMINATION PROGRAM

CROSS-REFERENCE TO RELATED APPLICATIONS

This application is a U.S. National Stage Application filed under 35 U.S.C. § 371 claiming priority to International Patent Application No. PCT/JP2019/023150, filed on 11 Jun. 2019, the disclosure of which is hereby incorporated herein by reference in its entirety.

TECHNICAL FIELD

The disclosed technology relates to a walking route determination device, a walking route determination method, and a walking route determination program.

BACKGROUND ART

Hitherto, there has been known, as a route determination technology, a technology of map matching that matches a positioning result based on a satellite signal received from a satellite with a route network representing a vehicle road. For example, as illustrated in FIG. 12, this is a technique of matching a positioning result (x signs in FIG. 12) with a link of a route network (black circles and broken lines of FIG. 12) having the smallest distance.

In the example of FIG. 12, correction can be made relatively correctly when an interval between roads is 10 m or more compared to an average error (10 m) of the positioning result. However, when there are two sidewalks sandwiching a vehicle road as the walking route as illustrated in FIG. 13, map matching cannot determine on which sidewalk a pedestrian is walking. This is because an interval between sidewalks is smaller than the satellite positioning error.

Meanwhile, there is known a walking road determination method of determining the true position of a person by detecting sidewalks on both sides of a road when performing map matching of matching a satellite positioning result (positioning point) with a sidewalk, and estimating which sidewalk is to select correctively by using the qualities of left and right radio wave reception environments obtained from the radio wave reception statuses of positioning satellites.

This walking road determination method involves determining the movement direction of a pedestrian, calculating an average value of satellite radio wave strengths received for respective left and right half-planes with respect to the movement direction, and determining that there is a pedestrian on a half-plane having a smaller radio wave strength (refer to FIG. 14). In FIG. 14, the movement direction of a pedestrian is a front-to-back direction on the sheet of FIG. 14.

CITATION LIST

Non Patent Literature

[NPL 1] Hirofumi Abe, Yoshihiro Ochiai, Hitoshi Seshimo, "Aabankyanionka ni Okeru Hokousya no Hokoutuuro Hanteihou (method of determining walking road of pedestrian under urban canyon)", The Institute of Image Information and Television Engineers, Annual Winter Convention 2018.

SUMMARY OF THE INVENTION

Technical Problem

However, the above-mentioned walking road determination method has two problems. First, it is difficult to select two opposite walking route networks, which are parallel to or substantially parallel (semi-parallel) to each other, at a location at which walking route networks are dense in a narrow space such as a city area or an intersection.

Second, the result of walking road determination is inferior to the result of map matching at a location at which there is only one sidewalk (walking route network) for one vehicle road (there is no opposite sidewalk).

The above-mentioned walking road determination method uses such an algorithm of detecting two sidewalks, which are to be subjected to walking road determination, as to simply set sidewalks closest to each other in terms of distance obtained from satellite positioning values as first and second candidates, and determining those two candidates as two parallel sidewalks. For example, in a pure straight road as illustrated in FIG. 15, two parallel walking links can be extracted as candidate links correctly.

This method is adequate for a pure straight section. However, it is difficult to correctly detect two parallel sidewalks along the movement direction of a pedestrian at a location at which sidewalks in various directions are set in a complex manner, such as an intersection (refer to FIG. 16).

In addition, when walking road determination is executed for a road including only one vehicle road and only one sidewalk, such as a suburb area, two walking route networks that are present before and after a certain location are selected as described below, leading to a result more inferior to the result of map matching, which is problematic (refer to FIG. 17 and FIG. 18).

In addition, as described above, when walking road determination is applied to a location including only one walking route network (e.g., sidewalk) near the current location, two walking route networks (broken lines and dotted line segments) before and after the location are selected, and left-right determination is made. As a result, the satellite position result is matched with the walking route network of any of the broken line or the dotted line. Selection of a broken line as illustrated in FIG. 18 results in a problem in that the positioning result of a black circle is corrected to a location (end point of broken line) far away from the current location. Such a problem occurs because two opposite walking route networks are assumed although there is one sidewalk in the first place.

In addition, NPL 1 assumes that there are sidewalks on both sides of a road, but in actuality, for example, there are a numerous number of roads with a width of 5 m or less, which do not have a sidewalk on both sides thereof (refer to FIG. 19). In such a location, a determination logic that does not perform walking road determination in the first place, or correction of the satellite positioning value by another processing is required.

The disclosed technology has been made in view of the above-mentioned points, and has an object to provide a walking route determination device, a walking route determination method, and a walking route determination program, which are capable of accurately estimating a walking route irrespective of the structure of a walking route network.

Means for Solving the Problem

A first aspect of this disclosure relates to a walking route determination device for determining a walking route of a target pedestrian based on position information of the pedestrian measured by a positioning device held by the pedestrian, the walking route determination device including: a nearby link extraction unit configured to acquire links forming n walking route networks in ascending order of distance from the position information of the pedestrian as link candidates for a walking route network through which the pedestrian is actually walking; a link combination extraction unit configured to acquire, from among link candidates having an angle with respect to a movement direction of the pedestrian being equal to or smaller than a threshold value among the link candidates for the n walking route networks, all the combinations of link candidates, and acquire, from among the acquired combinations of link candidates, all the combinations of link candidates that do not intersect with each other, do not connect to each other, and are not on the same straight line; and a candidate determination unit configured to acquire, when there are a plurality of acquired combinations of link candidates, a combination of link candidates that are closest to the position information of the pedestrian.

A second aspect of this disclosure relates to a walking route determination device for determining a walking route of a target pedestrian based on position information of the pedestrian measured by a positioning device held by the pedestrian, the walking route determination device including: a nearby link extraction unit configured to acquire links forming n walking route networks in ascending order of distance from the position information of the pedestrian as link candidates for a walking route network through which the pedestrian is actually walking; a link combination extraction unit configured to acquire, from among link candidates having an angle with respect to a movement direction of the pedestrian being equal to or smaller than a threshold value among the link candidates for the n walking route networks, all the combinations of link candidates, and acquire, from among the acquired combinations of link candidates, all the combinations of link candidates that do not intersect with each other, do not connect to each other, and are not on the same straight line; and a candidate determination unit configured to acquire, when a combination of link candidates are not acquired, one link candidate that is closest to the position information of the pedestrian and having an angle with respect to the movement direction of the pedestrian.

A third aspect of this disclosure relates to a walking route determination method for determining a walking route of a target pedestrian based on position information of the pedestrian measured by a positioning device held by the pedestrian, the walking route determination method including: acquiring, by a nearby link extraction unit, links forming n walking route networks in ascending order of distance from the position information of the pedestrian as link candidates for a walking route network through which the pedestrian is actually walking; acquiring, by a link combination extraction unit, from among link candidates having an angle with respect to a movement direction of the pedestrian being equal to or smaller than a threshold value among the link candidates for the n walking route networks, all the combinations of link candidates, and acquiring, by the link combination extraction unit, from among the acquired combinations of link candidates, all the combinations of link candidates that do not intersect with each other, do not connect to each other, and are not on the same straight line; and acquiring, by a candidate determination unit, when there are a plurality of acquired combinations of link candidates, a combination of link candidates that are closest to the position information of the pedestrian.

A fourth aspect of this disclosure relates to a walking route determination method for determining a walking route of a target pedestrian based on position information of the pedestrian measured by a positioning device held by the pedestrian, the walking route determination method including: acquiring, by a nearby link extraction unit, links forming n walking route networks in ascending order of distance from the position information of the pedestrian as link candidates for a walking route network through which the pedestrian is actually walking; acquiring, by a link combination extraction unit, from among link candidates having an angle with respect to a movement direction of the pedestrian being equal to or smaller than a threshold value among the link candidates for the n walking route networks, all the combinations of link candidates, and acquiring, by the link combination extraction unit, from among the acquired combinations of link candidates, all the combinations of link candidates that do not intersect with each other, do not connect to each other, and are not on the same straight line; and acquiring, by a candidate determination unit, when a combination of link candidates are not acquired, one link candidate that is closest to the position information of the pedestrian and having an angle with respect to the movement direction of the pedestrian being equal to or smaller than the threshold value.

A fifth aspect of this disclosure relates to a walking route determination program for determining a walking route of a target pedestrian based on position information of the pedestrian measured by a positioning device held by the pedestrian, the walking route determination program causing a computer to: acquire links forming n walking route networks in ascending order of distance from the position information of the pedestrian as link candidates for a walking route network through which the pedestrian is actually walking; acquire, from among link candidates having an angle with respect to a movement direction of the pedestrian being equal to or smaller than a threshold value among the link candidates for the n walking route networks, all the combinations of link candidates, and acquire, from among the acquired combinations of link candidates, all the combinations of link candidates that do not intersect with each other, do not connect to each other, and are not on the same straight line; and acquire, when there are a plurality of acquired combinations of link candidates, a combination of link candidates that are closest to the position information of the pedestrian.

A sixth aspect of this disclosure relates to a walking route determination program for determining a walking route of a target pedestrian based on position information of the pedestrian measured by a positioning device held by the pedestrian, the walking route determination program causing a computer to: acquire links forming n walking route networks in ascending order of distance from the position information of the pedestrian as link candidates for a walking route network through which the pedestrian is actually walking; acquire, from among link candidates having an angle with respect to a movement direction of the pedestrian being equal to or smaller than a threshold value among the link candidates for the n walking route networks, all the combinations of link candidates, and acquire, from among the acquired combinations of link candidates, all the combinations of link candidates that do not intersect with each other, do not connect to each other, and are not on the same straight line; and acquire, when a combination of link candidates are not acquired, one link candidate that is closest to the position information of the pedestrian and having an angle with respect to the movement direction of the pedestrian being equal to or smaller than the threshold value.

Effects of the Invention

According to the disclosed technology, it is possible to accurately estimate the walking route irrespective of the structure of the walking route network.

DESCRIPTION OF EMBODIMENTS

Figure 1:
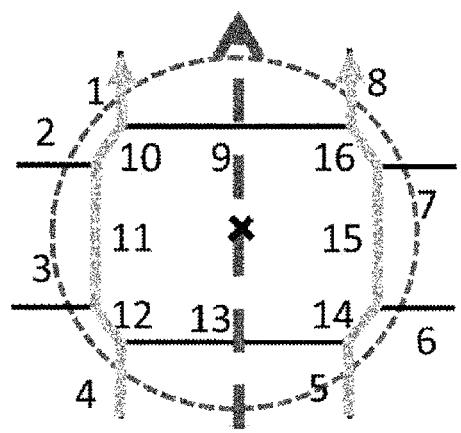
FIG. 1 is a diagram in a case where there are sidewalks on both sides of a road.

Now, description is given of an example of an embodiment of the disclosed technology with reference to the drawings. In each of the drawings, the same or equivalent component and part are assigned with the same reference numerals. Furthermore, the dimension of the drawings is enlarged for convenience of description, and may differ from an actual ratio.

Outline of this Embodiment

Figure 2:
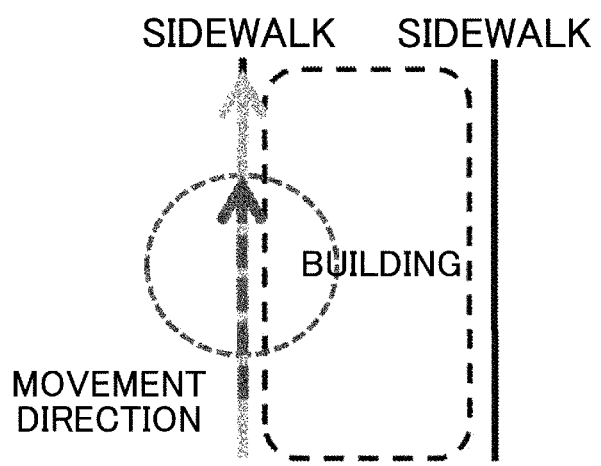
FIG. 2 is a diagram in a case where there is a sidewalk only on one side of a road.

As illustrated in FIG. 1, when a pedestrian is walking along a dotted line on a road with sidewalks on both sides thereof, this embodiment correctly detects the parallel sidewalks on both sides of the road. Meanwhile, as illustrated in FIG. 2, when a pedestrian is walking along a dotted line on a road without sidewalks on both sides thereof, this embodiment avoids executing the walking road determination processing itself of determining which sidewalk out of the sidewalks on both sides of the road is a correct walking route, and correctly detects the fact that there is only one road.

Figure 3:
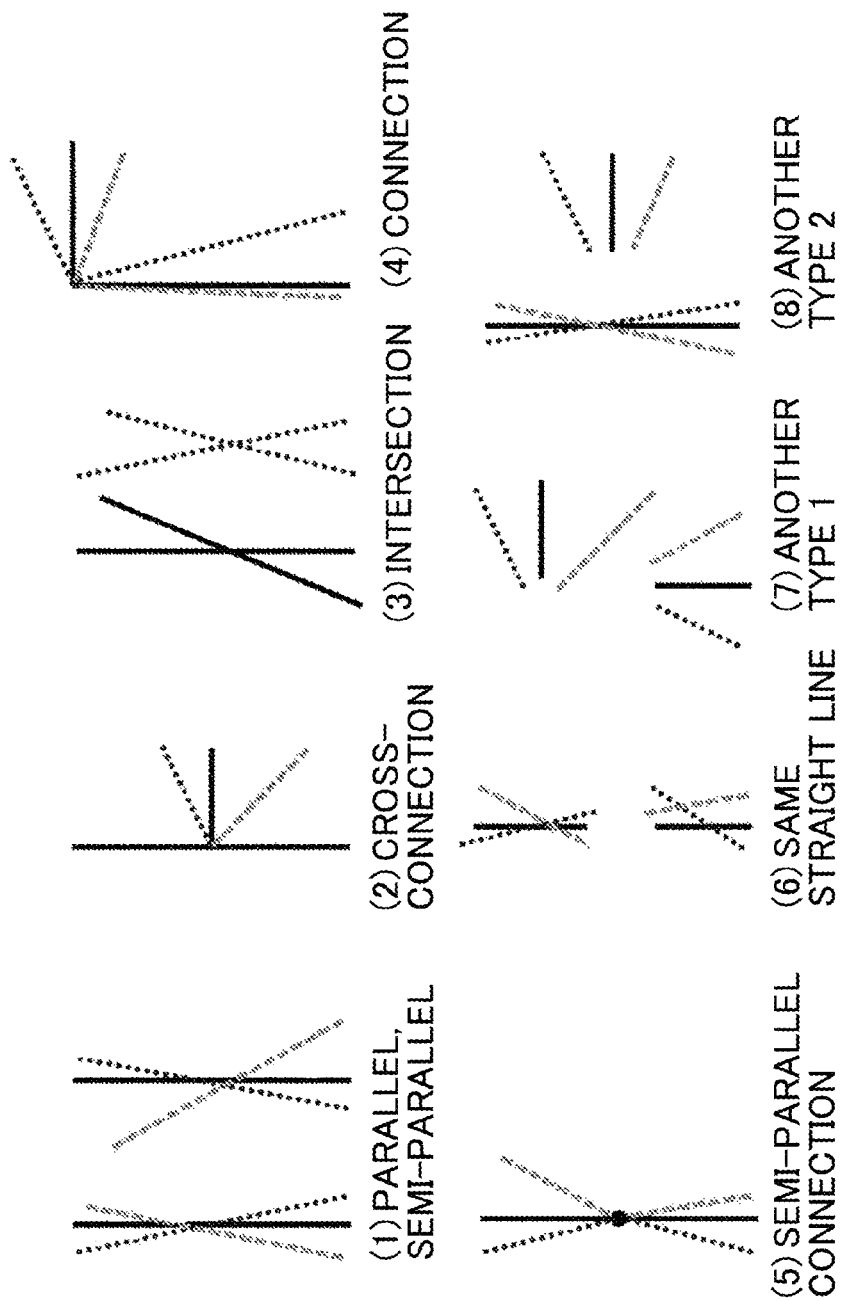
FIG. 3 is a diagram illustrating a relationship between a combination of links.

Specifically, when there are a (1) combination of two parallel or semi-parallel links among combinations of two links illustrated in (1) to (8) of FIG. 3, the combination of two links are output, whereas when there are no (1) combination of two parallel or semi-parallel links, the fact that there is no such combination of two links is output.

In (1) of FIG. 3, a combination of two links indicated by a solid line are parallel to each other, and a combination of two links indicated by a dotted line or broken line are semi-parallel to each other. In (2) of FIG. 3, a combination of two links indicated by a solid line are a cross-connection, and a combination of a vertical link and a link indicated by a dotted line and a combination of the vertical link and a link indicated by a broken line are also cross-connections. In (3) of FIG. 3, a combination of two links indicated by a solid line is an intersection, and a combination of two links indicated by a dotted line is also an intersection. In (4) of FIG. 3, a combination of two links indicated by a solid line are a connection, and a combination of two links indicated by a dotted line and a combination of two links indicated by a broken line are also connections. In (5) of FIG. 3, a combination of two links indicated by a solid line is a semi-parallel connection, and a combination of two links indicated by a dotted line and a combination of two links indicated by a broken line are also semi-parallel connections. In (6) of FIG. 3, a combination of two links indicated by a solid line are on the same straight line, and in this embodiment, a combination of two links indicated by a dotted line and a combination of two links indicated by a broken line are also considered as being on the same straight line. (7) and (8) of FIG. 3 represent a relationship other than the above-mentioned relationships (1) to (6) among the relationships between a combination of two links.

<Configuration of Walking Route Determination Device According to this Embodiment>

Figure 4:
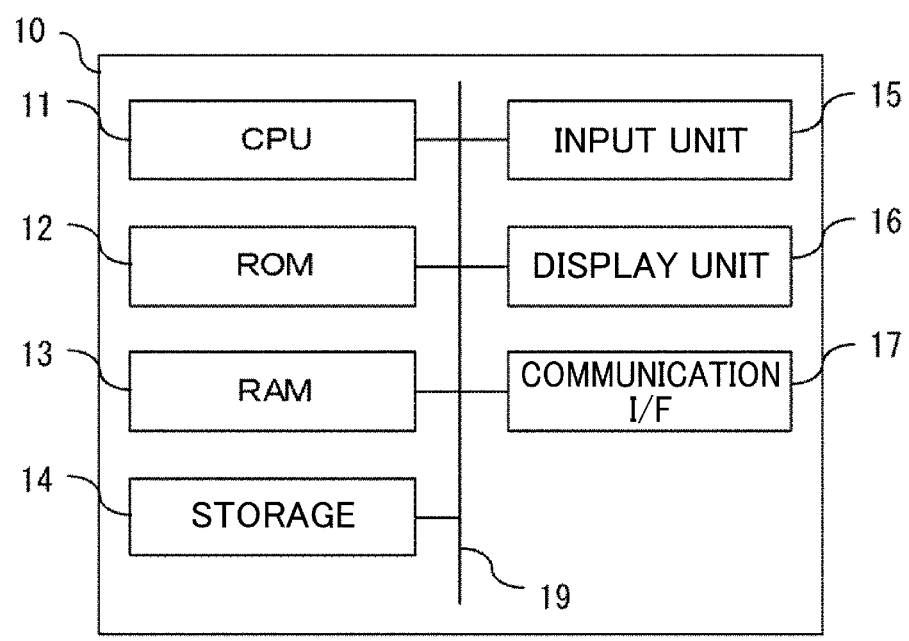
FIG. 4 is a schematic block diagram of an example of a computer functioning as a walking route determination device according to this embodiment.

FIG. 4 is a block diagram illustrating a hardware configuration of a walking route determination device 10 according to this embodiment.

As illustrated in FIG. 4, the walking route determination device 10 includes a central processing unit (CPU) 11, a read only memory (ROM) 12, a random access memory (RAM) 13, a storage 14, an input unit 15, a display unit 16, and a communication interface (I/F) 17. The components are communicably connected to one another via a bus 19.

The CPU 11 is a central arithmetic processing unit, and executes various kinds of programs or controls each component. In other words, the CPU 11 reads a program from the ROM 12 or the storage 14, and executes the program using the RAM 13 as a working area. The CPU 11 executes control of each component described above and various kinds of arithmetic processing in accordance with the program stored in the ROM 12 or the storage 14. In this embodiment, the ROM 12 or the storage 14 stores a walking route determination program for determining a walking route. The walking route determination program may be one program, or may be a group of programs including a plurality of programs or modules.

The ROM 12 stores various kinds of programs and various kinds of data. The RAM 13 temporarily stores a program or data as a working area. The storage 14 is constructed by a hard disk drive (HDD) or a solid state drive (SSD), and stores various kinds of programs including an operating system and various kinds of data.

The input unit 15 includes a pointing device such as a mouse, and a keyboard, and is used for various kinds of input.

Furthermore, the input unit 15 uses satellite signals received from a plurality of satellites by a satellite positioning device based on a global navigation satellite system (GNSS) held by a pedestrian to be positioned, to receive a satellite positioning value indicating the position of the pedestrian measured at each reception time.

Furthermore, the input unit 15 receives input of NMEA data included in the satellite signal received from each satellite. The NMEA data input to the walking route determination device 10 includes information such as a carrier/noise (C/No) ratio indicating the reception strength of a satellite signal, a satellite number, a satellite elevation angle, a satellite azimuth, and position dilution of precision (PDOP).

The display unit 16 is, for example, a liquid display, and displays various kinds of information. The display unit 16 may adopt a touch panel to function as the input unit 15.

The communication interface 17 is an interface for communicating with another device, and uses, for example, standards such as Ethernet (registered trademark), FDDI, and Wi-Fi (registered trademark).

Figure 5:
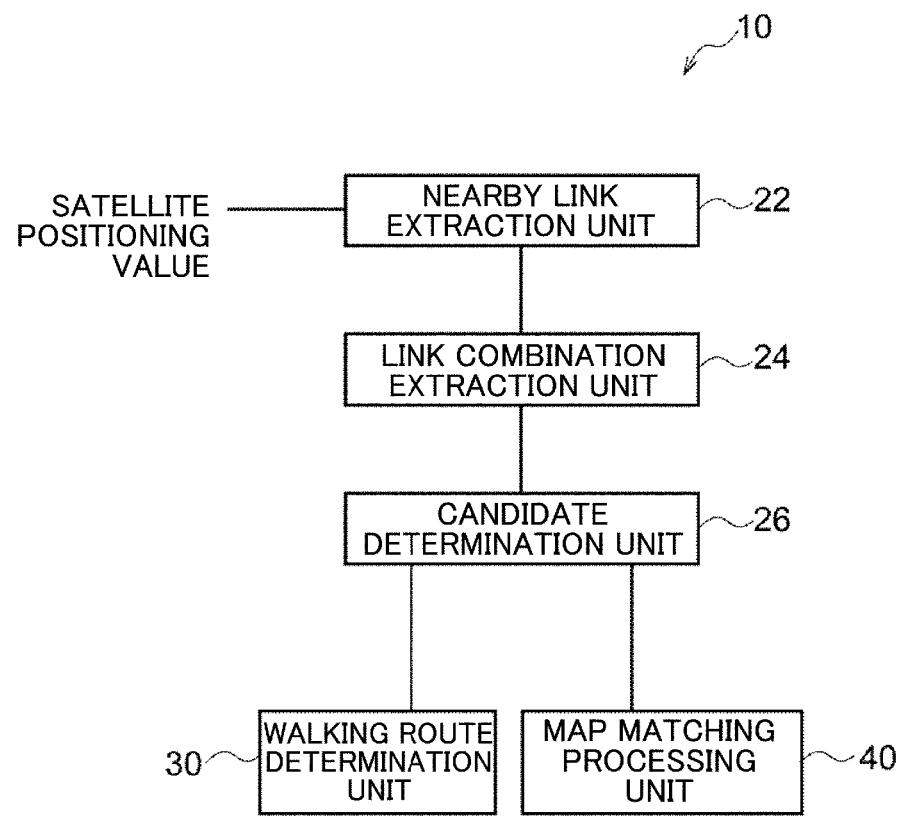
FIG. 5 is a block diagram illustrating a configuration of the walking route determination device according to this embodiment.

Next, description is given of a functional configuration of the walking route determination device 10. FIG. 5 is a block diagram illustrating an example of the functional configuration of the walking route determination device 10.

As illustrated in FIG. 5, the walking route determination device 10 includes, as its functional components, a nearby link extraction unit 22, a link combination extraction unit 24, a candidate determination unit 26, a walking route determination unit 30, and a map matching processing unit 40. Each functional component is implemented by the CPU 11 reading a walking route determination program stored in the ROM 12 or the storage 14, loading the walking route determination program into the RAM 13, and executing the walking route determination program.

The nearby link extraction unit 22 executes map matching of matching the satellite positioning value received by the input unit 15 at each reception time to any one of links forming a walking route network. The nearby link extraction unit 22 acquires, at each reception time, links forming n walking route networks in ascending order of distance from the satellite positioning value of the pedestrian as link candidates for a walking route network through which the pedestrian is actually walking.

The link combination extraction unit 24 determines, at each reception time, a direction corresponding to the measured trajectory of the pedestrian as the movement direction of the pedestrian. For example, the link combination extraction unit 24 determines the direction of a line segment connecting satellite positioning values before and after the reception time as the movement direction of the pedestrian.

The link combination extraction unit 24 extracts, from among link candidates for the n walking route networks, a link candidate closest to the satellite positioning value of the pedestrian. The link combination extraction unit 24 may determine, as the movement direction of the pedestrian, a direction that matches with a provisional movement direction obtained from the measured trajectory of the pedestrian among a forward direction and a backward direction of the direction of the extracted link candidate.

The link combination extraction unit 24 acquires a combination of link candidates at each reception time in the following manner.

First, the link combination extraction unit 24 uses a link candidate whose an angle with respect to the movement direction of the pedestrian is equal to or smaller than a threshold value among the link candidates for the n walking route network, to acquire all the combinations of two link candidates.

Next, the link combination extraction unit 24 acquires, from among the acquired combinations of two link candidates, all the combinations of two link candidates that do not intersect with each other.

Next, the link combination extraction unit 24 acquires, from among the acquired combinations of two link candidates, all the combinations of two link candidates that do not connect to each other.

Next, the link combination extraction unit 24 acquires, from among the acquired combinations of two link candidates, all the combinations of two link candidates that are not on the same straight line, and sets those combinations as the definitive combinations of two link candidates.

When there are a plurality of acquired combinations of two link candidates at each reception time, the candidate determination unit 26 acquires a combination of two link candidates that are closest to the satellite positioning value of the reception time. Specifically, the candidate determination unit 26 extracts, from among the acquired combinations of two link candidates, a combination of two link candidates having the minimum sum of distances to the satellite positioning value of the reception time.

On the other hand, when a combination of two link candidates are not acquired at each reception time, the candidate determination unit 26 acquires one link candidate that is closest to the satellite positioning value of the reception time and whose angle with respect to the movement direction of the pedestrian is equal to or smaller than the threshold value.

When the candidate determination unit 26 has extracted a combination of two link candidates, the walking route determination unit 30 executes, for the combination of two link candidates, walking route determination processing of determining which sidewalk out of sidewalks on both sides of the road is a correct walking route. The walking route determination unit 30 uses the walking route obtained by the walking route determination processing to correct the satellite positioning value at each reception time.

Specifically, the walking route determination unit 30 determines a section in which the combination of two link candidates switch based on the combination of two link candidates acquired at each reception time. Then, the walking route determination unit 30 calculates, for each section, an environment value indicating the quality of a reception environment of satellite data for each of a right half plane and a left half plane with respect to the movement direction of the pedestrian based on input NMEA. The method of calculating a reception environment is similar to that of NPL 1, and thus description thereof is omitted here.

Then, the walking route determination unit 30 compares the environment value calculated for the left half plane and the environment value calculated for the right half plane to determine the walking route of the pedestrian. Specifically, the walking route determination unit 30 compares the left and right environment values with each other for each section, and selects one of the combination of two link candidates corresponding to a (left-right) direction having a smaller environment value as the walking route.

Furthermore, the walking route determination unit 30 executes map matching of matching the selected walking route with the satellite positioning value at each reception time, to correct the satellite positioning value to a position on the walking route network and determine the walking route.

When the candidate determination unit 26 has acquired one link candidate, the map matching processing unit 40 executes map matching of matching the satellite positioning value at each reception time to the one link candidate, to correct the satellite positioning value to a position on the walking route network and determine the walking route.

<Action of Walking Route Determination Device According to this Embodiment>

Next, description is given of an action of the walking route determination device 10.

Figure 6:
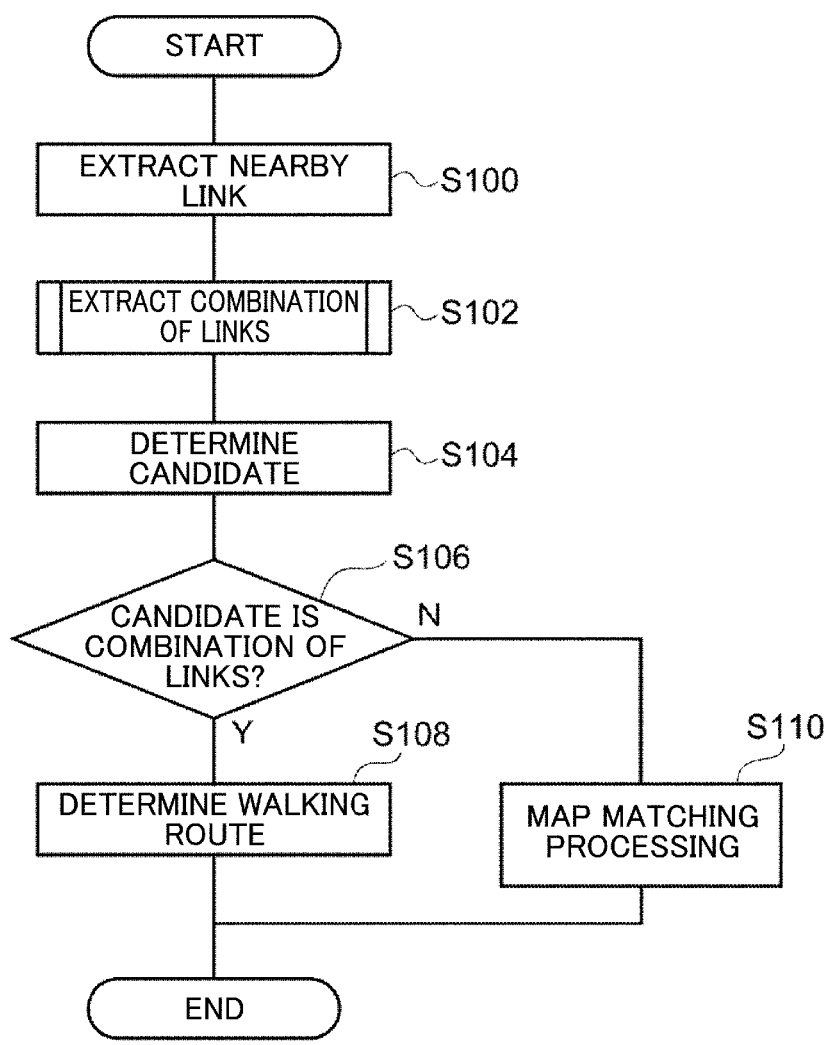
FIG. 6 is a flow chart illustrating a walking route determination processing routine of the walking route determination device according to this embodiment.

FIG. 6 is a flow chart illustrating a flow of the walking route determination processing to be executed by the walking route determination device 10. The CPU 11 reads the walking route determination program from the ROM 12 or the storage 14, loads the walking route determination program into the RAM 13, and executes the walking route determination program, so that the walking route determination processing is executed.

In Step S100, the CPU 11 serves as the nearby link extraction unit 22 to execute map matching of matching the satellite positioning value received by the input unit 15 at each reception time to any one of links forming a walking route network. The CPU 11 serves as the nearby link extraction unit 22 to acquire, at each reception time, links forming n walking route networks in ascending order of distance from the position information of the pedestrian as link candidates for a walking route network through which the pedestrian is actually walking.

In Step S102, the CPU 11 serves as the link combination extraction unit 24 to acquire a combination of link candidates at each reception time.

Figure 7:
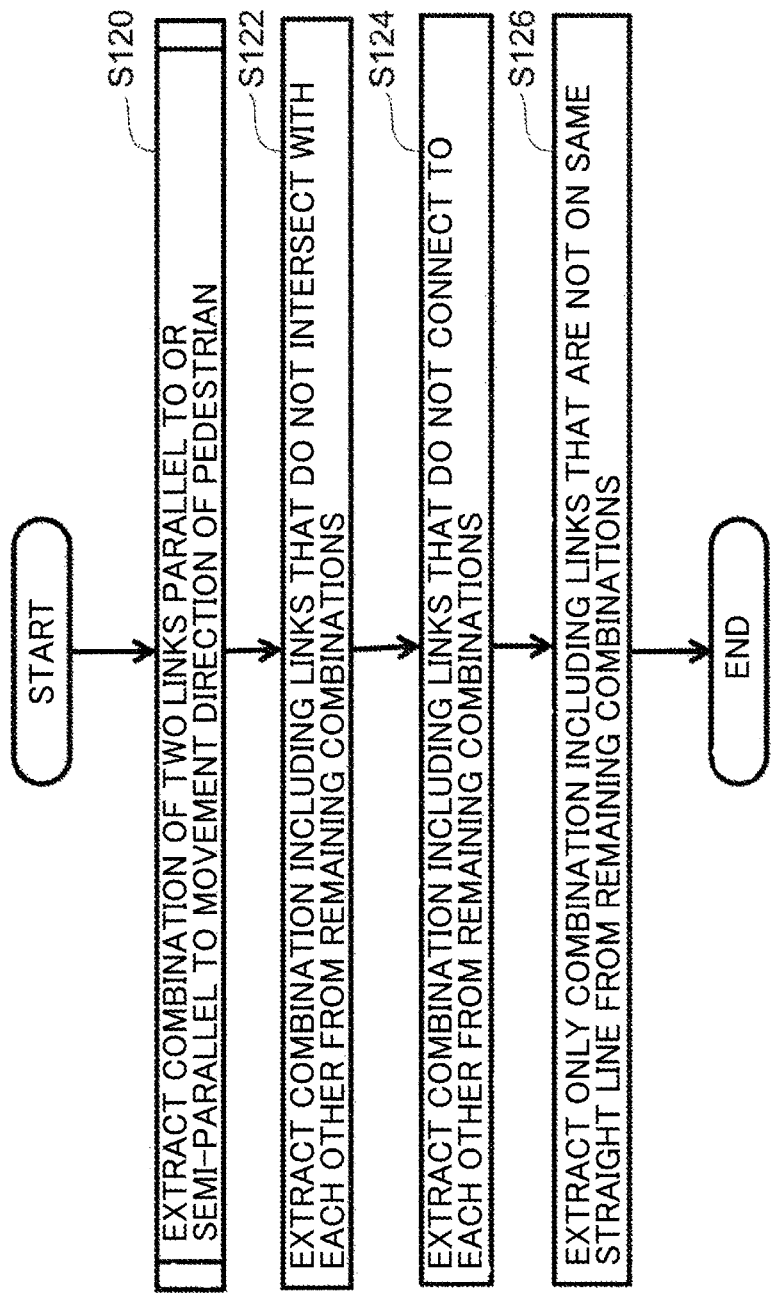
FIG. 7 is a flow chart illustrating a flow of processing of extracting a combination of links of the walking route determination device according to this embodiment.

The processing of Step S102 described above is implemented by the processing illustrated in FIG. 7.

First, in Step S120, the CPU 11 serves as the link combination extraction unit 24 to use a link candidate whose an angle with respect to the movement direction of the pedestrian is equal to or smaller than a threshold value among the link candidates for the n walking route network acquired in Step S100 described above, to acquire all the combinations of two link candidates.

Figure 8:
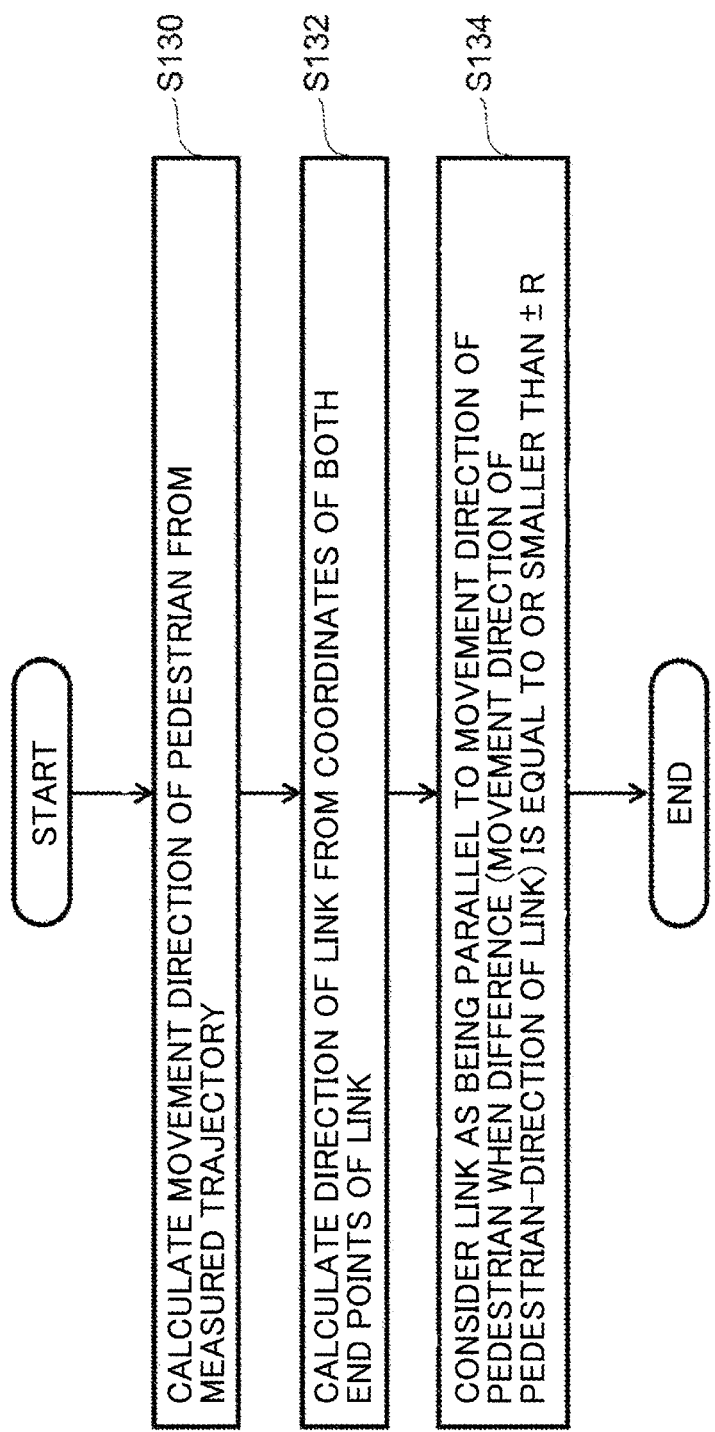
FIG. 8 is a flow chart illustrating a flow of processing of extracting links parallel to a movement direction of a pedestrian of the walking route determination device according to this embodiment.

The processing of Step S120 described above is implemented by the processing illustrated in FIG. 8.

In Step S130, the CPU 11 serves as the link combination extraction unit 24 to determine the movement direction of the pedestrian at each reception time.

In Step S132, the CPU 11 serves as the link combination extraction unit 24 to calculate, for each link candidate for the n walking route networks, the direction of the link candidate based on coordinates of both end points of the link candidate.

In Step S134, the CPU 11 serves as the link combination extraction unit 24 to determine, for each link candidate for the n walking route network, that the link candidate is parallel to or semi-parallel to the movement direction of the pedestrian when the angle between the movement direction of the pedestrian and the direction of the link candidate is equal to or smaller than a threshold value. Then, the CPU 11 extracts a combination of two link candidates obtained by combining link candidates parallel to or semi-parallel to the movement direction of the pedestrian.

Next, in Step S122, the CPU 11 serves as the link combination extraction unit 24 to acquire all the combinations of two link candidates that do not intersect with each other among the combinations of two link candidates acquired in Step S120 described above.

Now, description is given of a method of determining whether two link candidates intersect with each other. One link is set as a line segment AB having a point A (x1, y1) and a point B(x2, y2) as its both end points, and the other link is set as a line segment CD having a point C(x3, y3) and a point D(x4, y4) as its both end points.

The equation of a straight line passing through the point A(x1, y1) and the point B (x2, y2) is represented by the following expression.

$$(x1-x2)*(y-y1)+(y1-y2)*(x1-x)=0$$

It is possible to determine an intersection between a straight line and a line segment by substituting a point C(x3, y3) and a point D(x4, y4) into the left side of this equation and checking the sign.

For example, the following expression is calculated when the point C is substituted into the left side of the above-mentioned equation.

$$tc=(x1-x2)*(y3-y1)+(y1-y2)*(x1-x3)$$

In other cases, the following expression is calculated when the point D is substituted into the left side of the above-mentioned equation.

$$td=(x1-x2)*(y4-y1)+(y1-y2)*(x1-x4)$$

The following expression (1) represents an intersection between the straight line passing through the points A and B and the line segment CD when the signs of two expressions are different from each other.

$$tc*td<0 \qquad (1)$$

Similarly, an intersection between the straight line passing through the points C and D and the line segment AB can be determined by using the following expression.

$$ta=(x3-x4)*(y1-y3)+(y3-y4)*(x3-x1)tb=(x3-x4)*(y2-y3)+(y3-y4)*(x3-x2)ta*tb<0 \qquad (2)$$

An intersection between the line segment AB and the line segment CD can be determined by combining the above-mentioned expressions (1) and (2).

[Reference Literature 1] Kouhei Nohira, Mamoru, Hoshi, Hajime Sato, Azuma Taguchi, joint translation "Algorithms in C Part 3", Kindai kagaku sha Co., Ltd. [Reference Literature 2] Junro Emura, Yoshinori Uesaka, Munemi Asai, Makoto Arisawa, Shunsuke Nishimura, "Algorithm and data structure", Jikkyo Shuppan Co., Ltd. [Reference Literature 3] the Internet <URL:http://www5d.biglobe.ne.jp/~tomoya03/shtml/algorithm/Intersection.htm>

Next, in Step S124, the CPU 11 serves as the link combination extraction unit 24 to acquire all the combinations of two link candidates that do not connect to each other among the combinations of two link candidates acquired in Step S122 described above.

Now, description is given of a method of determining whether two link candidates are connected to each other. One link is set as a line segment AB having a point A (x1, y1) and a point B(x2, y2) as its both end points, and the other link is set as a line segment CD having a point C(x3, y3) and a point D(x4, y4) as its both end points.

Connection between the point A of the line segment AB and the point C of the line segment CD is represented by the following expression.

$$(x1-x3)+(y1-y3)=0$$

Similarly to the connection between the point A and the point C, the connection between the point A and the point D, the connection between the point B and the point C, and the connection between the point B and the point D are also represented by the following expressions.

$$(x1-x4)+(y1-y4)=0$$

$$(x2-x3)+(y2-y3)=0$$

$$(x2-x4)+(y2-y4)=0$$

The connection between the line segment AB and the line segment CD can be determined when any one of the four expressions given above is satisfied.

Next, in Step S126, the CPU 11 serves as the link combination extraction unit 24 to acquire all the combinations of two link candidates that are not on the same straight line from among the combinations of two link candidates acquired in Step S124 described above.

Now, description is given of a method of determining whether the two link candidates are on the same straight line.

First, unit vectors A to D connecting between end points of a link 1 and a link 2, and a unit vector L parallel to the link 1 are defined. The inner product of vectors parallel to each other results in 1, whereas the inner product of vectors orthogonal to each other results in 0.

Figure 9:
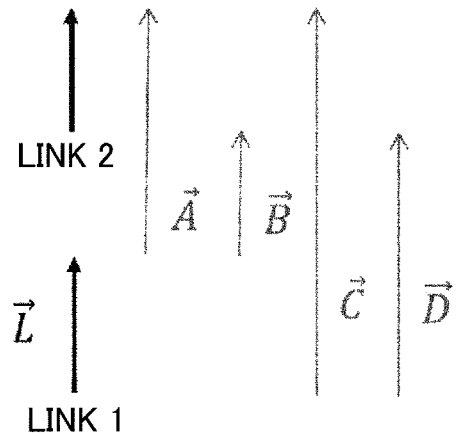
FIG. 9 is a diagram in a case where a combination of links are on the same straight line.
Figure 10:
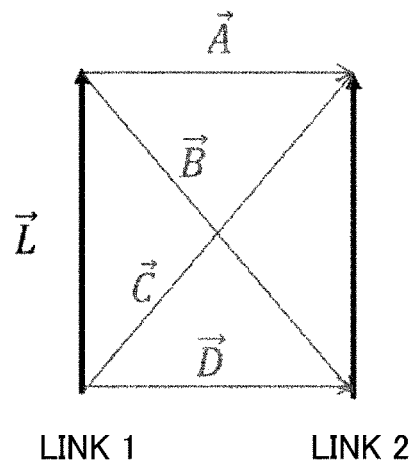
FIG. 10 is a diagram in a case where a combination of links are parallel to each other.

Thus, an inner product value=→L·→A+→L·→B+→L·→C+→L·→D is calculated, and when the inner product value is larger than a threshold value, as illustrated in FIG. 9, the vectors are considered as being on the same straight line, whereas when the inner product value is equal to or smaller than the threshold value, as illustrated in FIG. 10, the vectors are considered as being parallel to each other.

Then, in Step S104 of FIG. 6, when there are a plurality of combinations of two link candidates acquired in Step S102 described above at each reception time, the CPU 11 serves as the candidate determination unit 26 to acquire a combination of two link candidates that are closest to the satellite positioning value of the reception time.

Specifically, the candidate determination unit 26 extracts, from among the acquired combinations of two link candidates, a combination of two link candidates having the minimum sum of distances to the satellite positioning value of the reception time.

Figure 11:
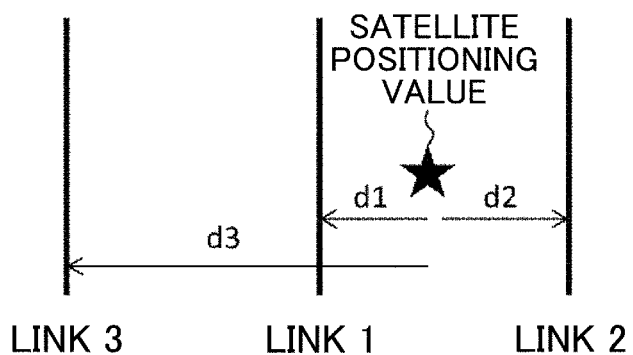
FIG. 11 is a diagram in a case where there are a plurality of combinations of links parallel to each other.
Figure 12:
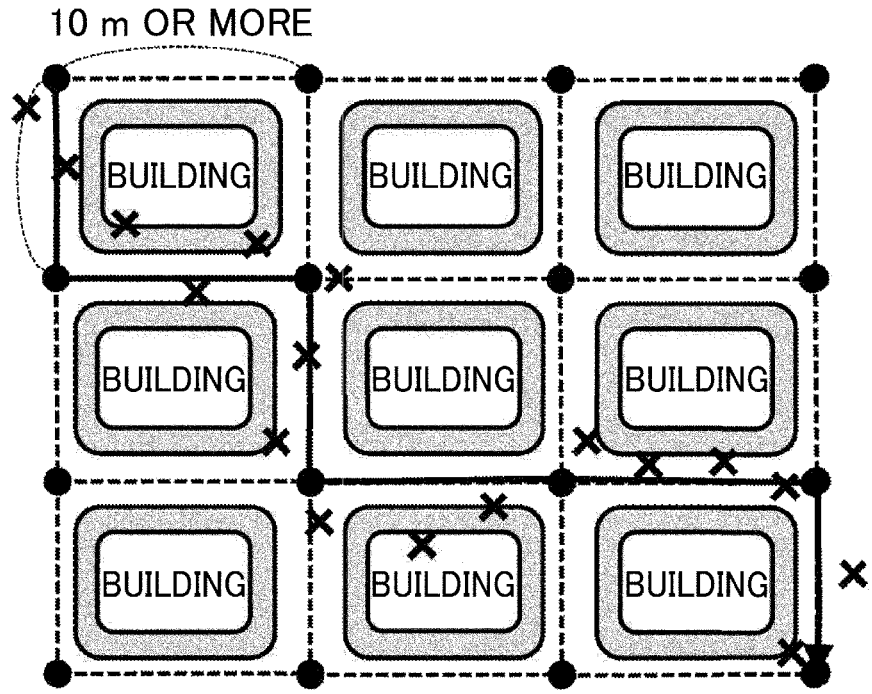
FIG. 12 is a diagram for describing map matching to a route network representing a vehicle road.
Figure 13:
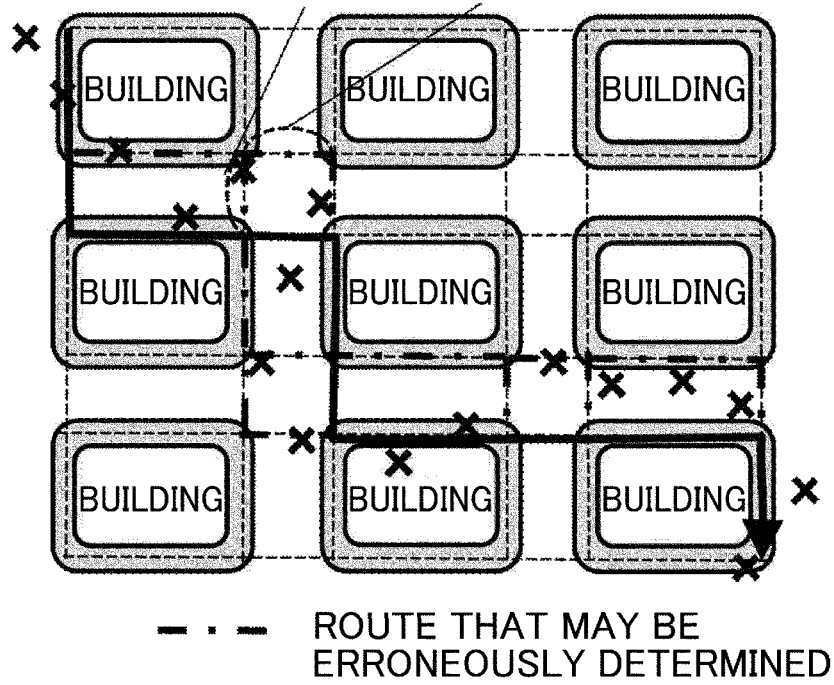
FIG. 13 is a diagram for describing a problem of map matching to the route network representing a vehicle road.
Figure 14:
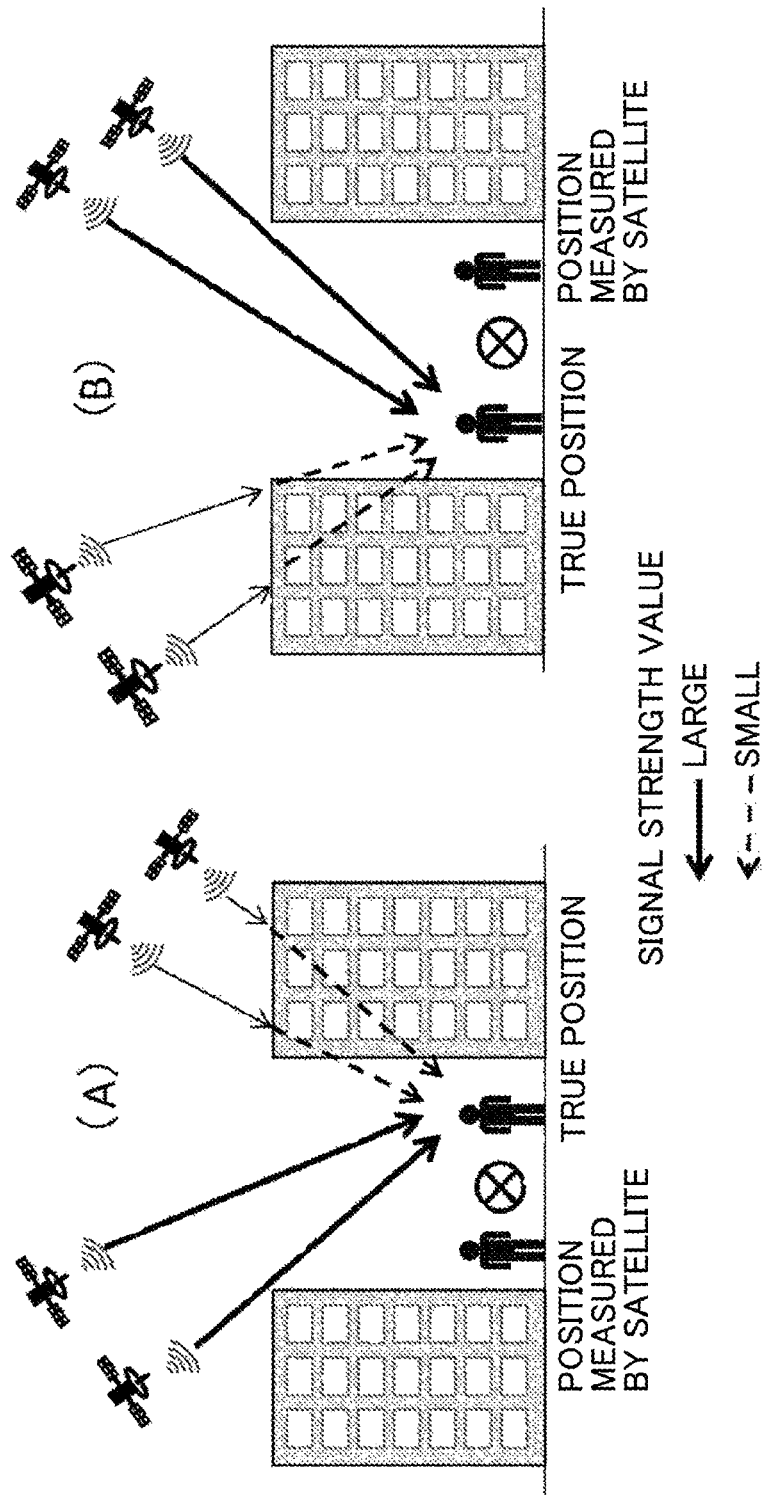
FIG. 14 is a diagram for describing a quality of view of satellites in a case where pedestrians are walking on a right sidewalk and a left sidewalk across the vehicle road.
Figure 15:
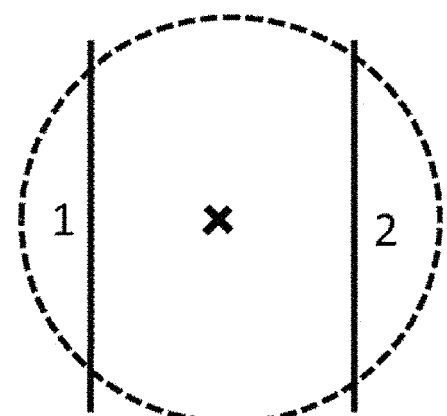
FIG. 15 is a diagram in a case where two parallel links can be extracted correctly.
Figure 16:
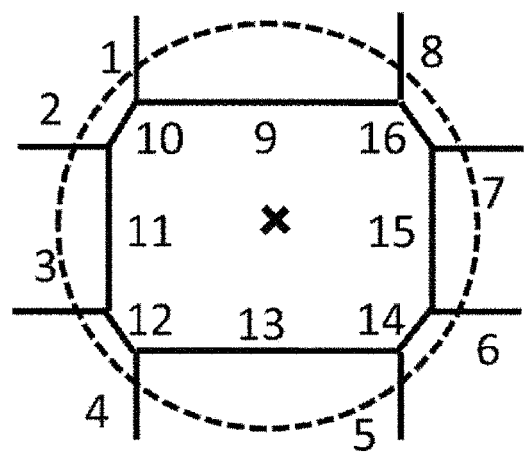
FIG. 16 is a diagram in a case where two parallel links cannot be extracted correctly.
Figure 17:
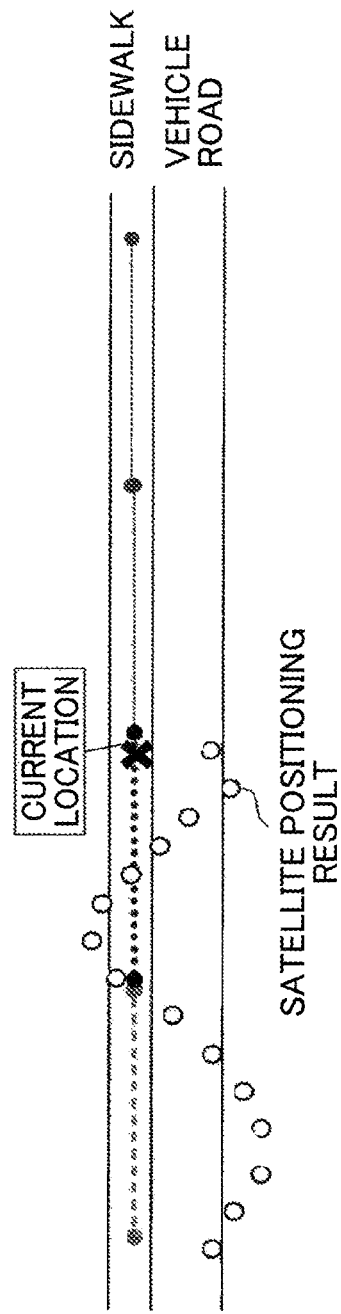
FIG. 17 is a diagram in a case where there are only one vehicle road and only one sidewalk.
Figure 18:
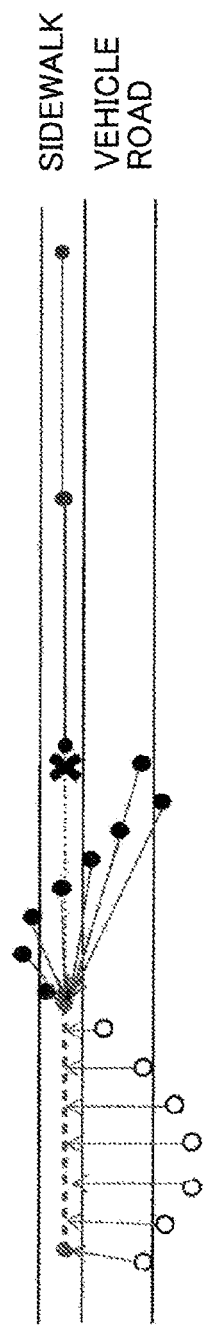
FIG. 18 is a diagram in a case where there is a sidewalk on the left or right side of a road and in a case where there is no pedestrian on the left or right side of the road.
Figure 19:
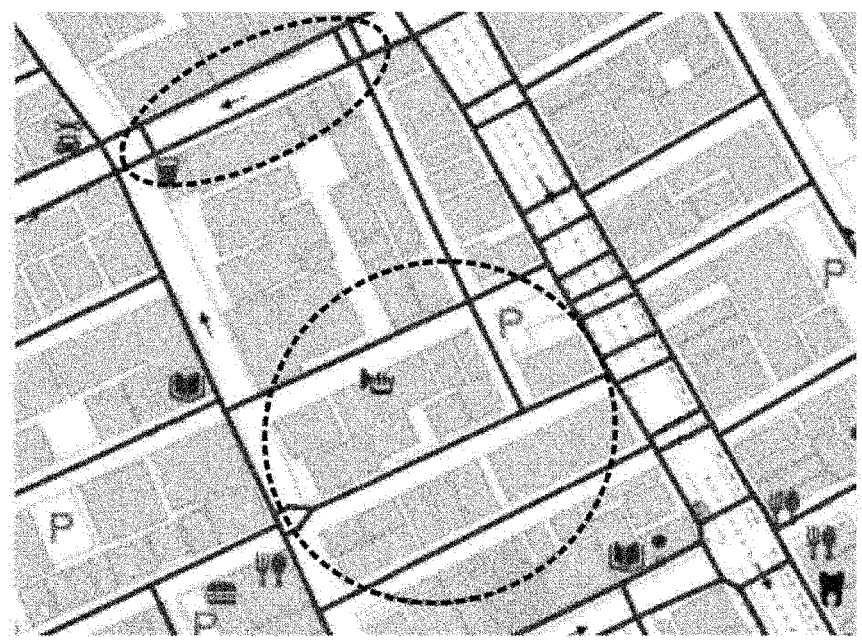
FIG. 19 is a diagram for describing a location at which there is no sidewalk on both sides of a road.

For example, as illustrated in FIG. 11, when a plurality of combinations of two links are acquired, a combination of two links closer to the satellite positioning value are more desirable as a candidate to be subjected to walking road determination processing.

Thus, a sum of distances between the satellite positioning value and each link is calculated to be d1+d3, d1+d2, d2+d3, and a combination of two links having the smallest value is set as a candidate to be subjected to walking road determination processing.

Furthermore, when a combination of two link candidates are not acquired in Step S102 described above at each reception time, the CPU 11 serves as the candidate determination unit 26 to acquire one link candidate that is closest to the satellite positioning value of the reception time and whose angle with respect to the movement direction of the pedestrian is equal to or smaller than the threshold value.

In Step S106, the CPU 11 determines whether a combination of two links are acquired in Step S104 described above. When a combination of two links are acquired, the processing transitions to the processing of Step S108, whereas when a combination of two links are not acquired, the processing transitions to the processing of Step S110.

In Step S108, the CPU 11 serves as the walking route determination unit 30 to execute the walking route determination processing for the combination of two link candidates, and uses the walking route to correct the satellite positing value at each reception time. Then, the walking route determination processing is finished.

In Step S110, when the candidate determination unit 26 has acquired one link candidate, the CPU 11 serves as the map matching processing unit 40 to execute map matching of matching the satellite positioning value at each reception time to the one link candidate. In this manner, the CPU 11 corrects the satellite positioning value to a position on the walking route network and determines the walking route. Then, the walking route determination processing is finished.

As described above, the walking route determination device according to this embodiment acquires links forming n walking route networks in ascending order of distance from the position information of the pedestrian as link candidates for a walking route network through which the pedestrian is actually walking. The walking route determination device acquires, from among link candidates having an angle with respect to a movement direction of the pedestrian being equal to or smaller than a threshold value among the link candidates for the n walking route networks, all the combinations of link candidates. The walking route determination device acquires, from among the acquired combinations of link candidates, all the combinations of link candidates that do not intersect with each other. The walking route determination device acquires, from among the acquired combinations of link candidates, all the combinations of link candidates that do not connect to each other. The walking route determination device acquires, from among the acquired combinations of link candidates, all the combinations of link candidates that are not on the same straight line. The walking route determination device acquires, when there are a plurality of acquired combinations of link candidates, a combination of link candidates that are closest to the position information of the pedestrian. The walking route determination device acquires, when a combination of link candidates are not acquired, one link candidate that is closest to the position information of the pedestrian and having an angle with respect to the movement direction of the pedestrian being equal to or smaller than the threshold value. In this manner, it is possible to accurately estimate the walking route irrespective of the structure of the walking route network.

The walking route determination processing, which is executed by the CPU reading software (program) in each embodiment given above, may be executed by various kinds of processors other than the CPU. Examples of the processor in this case are a programmable logic device (PLD) whose circuit configuration can be changed after production, such as a field-programmable gate array (FPGA), and a dedicated electric circuit being a processor including a circuit configuration designed in a dedicated manner so as to execute specific processing, such as an application specific integrated circuit (ASIC). Furthermore, the walking route determination processing may be executed by one of these various kinds of processors, or may be executed by a combination of the same type of or different types of two or more processors (e.g., a combination of plurality of FPGAs and CPU, and a combination of CPU and FPGA). Furthermore, the hardware structure of these various kinds of processors is an electric circuit obtained by combining circuit devices such as semiconductor devices more specifically.

Furthermore, in each embodiment given above, description is given of an aspect in which the walking route determination program is stored (installed) in the storage 14 in advance, but is not limited thereto. The program may be stored in a non-transitory storage medium such as a compact disk read only memory (CD-ROM), a digital versatile disk read only memory (DVD-ROM) or a universal serial bus (USB) memory to be provided. Furthermore, the program may be downloaded from an external device via a network.

The following supplementary notes are disclosed in relation to the embodiment given above.

(Supplementary Item 1)

A walking route determination device for determining a walking route of a target pedestrian based on position information of the pedestrian measured by a positioning device held by the pedestrian, the walking route determination device including a memory and at least one processor connected to the memory, the processor being configured to: acquire links forming n walking route networks in ascending order of distance from the position information of the pedestrian as link candidates for a walking route network through which the pedestrian is actually walking; acquire, from among link candidates having an angle with respect to a movement direction of the pedestrian being equal to or smaller than a threshold value among the link candidates for the n walking route networks, all the combinations of link candidates, and acquire, from among the acquired combinations of link candidates, all the combinations of link candidates that do not intersect with each other, do not connect to each other, and are not on the same straight line; and acquire, when there are a plurality of acquired combinations of link candidates, a combination of link candidates that are closest to the position information of the pedestrian.

(Supplementary Item 2)

A walking route determination device for determining a walking route of a target pedestrian based on position information of the pedestrian measured by a positioning device held by the pedestrian, the walking route determination device including a memory and at least one processor connected to the memory, the processor being configured to: acquire links forming n walking route networks in ascending order of distance from the position information of the pedestrian as link candidates for a walking route network through which the pedestrian is actually walking; acquire, from among link candidates having an angle with respect to a movement direction of the pedestrian being equal to or smaller than a threshold value among the link candidates for the n walking route networks, all the combinations of link candidates, and acquire, from among the acquired combinations of link candidates, all the combinations of link candidates that do not intersect with each other, do not connect to each other, and are not on the same straight line; and acquire, when a combination of link candidates are not acquired, one link candidate that is closest to the position information of the pedestrian and having an angle with respect to the movement direction of the pedestrian being equal to or smaller than the threshold value.

(Supplementary Item 3)

A non-transitory storage medium having stored thereon a program executable by a computer so as to execute walking route determination processing of determining a walking route of a target pedestrian based on position information of the pedestrian measured by a positioning device held by the pedestrian, the walking route determination processing including: acquiring, by a nearby link extraction unit, links forming n walking route networks in ascending order of distance from the position information of the pedestrian as link candidates for a walking route network through which the pedestrian is actually walking; acquiring, by a link combination extraction unit, from among link candidates having an angle with respect to a movement direction of the pedestrian being equal to or smaller than a threshold value among the link candidates for the n walking route networks, all the combinations of link candidates, and acquiring, by the link combination extraction unit, from among the acquired combinations of link candidates, all the combinations of link candidates that do not intersect with each other, do not connect to each other, and are not on the same straight line; and acquiring, by a candidate determination unit, when there are a plurality of acquired combinations of link candidates, a combination of link candidates that are closest to the position information of the pedestrian.

(Supplementary Item 4)

A non-transitory storage medium having stored thereon a program executable by a computer so as to execute walking route determination processing of determining a walking route of a target pedestrian based on position information of the pedestrian measured by a positioning device held by the pedestrian, the walking route determination processing including: acquiring, by a nearby link extraction unit, links forming n walking route networks in ascending order of distance from the position information of the pedestrian as link candidates for a walking route network through which the pedestrian is actually walking; acquiring, by a link combination extraction unit, from among link candidates having an angle with respect to a movement direction of the pedestrian being equal to or smaller than a threshold value among the link candidates for the n walking route networks, all the combinations of link candidates, and acquiring, by the link combination extraction unit, from among the acquired combinations of link candidates, all the combinations of link candidates that do not intersect with each other, do not connect to each other, and are not on the same straight line; and acquiring, by a candidate determination unit, when a combination of link candidates are not acquired, one link candidate that is closest to the position information of the pedestrian and having an angle with respect to the movement direction of the pedestrian being equal to or smaller than the threshold value.

REFERENCE SIGNS LIST

10 Walking route determination device
22 Nearby link extraction unit
24 Link combination extraction unit
26 Candidate determination unit
30 Walking route determination unit
40 Map matching processing unit

The invention claimed is:

1. A walking route determination device for determining a walking route of a pedestrian based on position information of the pedestrian measured by a positioning device held by the pedestrian walking at a location as identified by the position information, the walking route determination device comprising circuitry configured to execute operations comprising:

generating, based on a plurality of links in a plurality of walking route networks in ascending order of distance from the position information of the pedestrian as link candidates, wherein each link candidate indicates a link candidate in a walking route network through which the pedestrian is actually walking at the location, the walking route network includes a link as a pedestrian path in a walking route network and a node as a point on the pedestrian path, and the link connects two nodes;

generating, from the link candidates for the plurality of walking route networks, a first set of link candidates, wherein each link candidate in the first set of link candidates indicates an angle formed between a movement direction of the pedestrian walking at the location and a direction of said each link being equal to or smaller than a predetermined value;

generating, from the first set of link candidates, a second set of link candidates, wherein each link candidate in the second set of link candidates satisfies conditions including:
said each link candidate does not intersect with any other link candidate in the second set of link candidates,
said each link candidate does not connect to any other link candidate in the second set of link candidates, and
said each link candidate and any other link candidate in the second set of link candidates are not on the same straight line;

generating, from the second set of link candidates, a third set of link candidates wherein, when the second set of link candidates includes a plurality of link candidates, the third set of link candidates includes a pair of link candidates in the second set of link candidates that are the closest and the next closest to the position information of the pedestrian walking at the location;

determining, based on the third set of link candidates, walking route data of the walking route of the pedestrian walking at the location; and transmitting the walking route data to an application configured to display the walking route.

2. A walking route determination device for determining a walking route of a pedestrian based on position information of the pedestrian measured by a positioning device held by the pedestrian walking at a location as identified by the position information, the walking route determination device comprising circuitry configured to execute operations comprising:

generating, based on a plurality of links in a plurality of walking route networks in ascending order of distance from the position information of the pedestrian as link candidates, wherein each link candidate indicates a link candidate in a walking route network through which the pedestrian is actually walking at the location, the walking route network includes a link as a pedestrian path in a walking route network and a node as a point on the pedestrian path, and the link connects two nodes;

generating, from the link candidates for the plurality of walking route networks, a first set of link candidates, wherein each link candidate of the first set includes link candidates having an angle with respect to a movement direction of the pedestrian being equal to or smaller than a predetermined value;

generating, from the first set of link candidates, a second set of link candidates, wherein the second set of link candidates includes a plurality of link candidates, and each link candidate in the second set of link candidates satisfies conditions including:
said each link candidate does not intersect with any other link candidate in the second set of link candidates,
said each link candidate does not connect to any other link candidate in the second set of link candidates, and
said each link candidate and any other link candidate in the second set of link candidates are not on the same straight line;

when the second set includes no link candidate, selecting, from the plurality of links, one link candidate that is closest to the position information of the pedestrian and having an angle with respect to the movement direction of the pedestrian being equal to or smaller than the predetermined value;

determining, based on the one link candidate, walking route data of the walking route of the pedestrian walking at the location; and transmitting the walking route data to an application configured to display the walking route.

3. The walking route determination device according to claim 1, the method further comprising:
determining, as the movement direction of the pedestrian, a direction that matches with a measured trajectory of the pedestrian among a forward direction and a backward direction of a direction of a link candidate for the walking route network that is closest to the position information of the pedestrian.

4. The walking route determination device according to claim 1, the method further comprising:
calculating, when a combination of link candidates that are not on the same straight line are acquired, a sum of inner products of unit vectors $\vec{A}$, $\vec{B}$, $\vec{C}$, $\vec{D}$ of vectors, which connect both end points of one link candidate to both end points of the other link candidate among the combination of link candidates, respectively, and a unit vector $\vec{L}$ of the one link candidate;
determining that the combination of link candidates are not on the same straight line when the calculated sum of inner products is smaller than a threshold value.

5. A walking route determination method for determining a walking route of a pedestrian based on position information of the pedestrian measured by a positioning device held by the pedestrian walking at a location as identified by the position information, the walking route determination method comprising:

generating, based on a plurality of links in a plurality of walking route networks in ascending order of distance from the position information of the pedestrian as link candidates, wherein each link candidate indicates a link candidate in a walking route network through which the pedestrian is actually walking at the location, the walking route network includes a link as a pedestrian path in a walking route network and a node as a point on the pedestrian path, and the link connects two nodes;

generating, the link candidates for the plurality of walking route networks, a first set of link candidates, wherein each link candidate of the first set includes a link candidate having an angle with respect to a movement direction of the pedestrian being equal to or smaller than a predetermined value;

generating, from the first set of link candidates, one or more link candidates, wherein the second set of link candidates includes a plurality of link candidates, and each link candidate in the second set of link candidates satisfies conditions including:
  said each link candidate does not intersect with any other link candidate in the second set of link candidates,
  said each link candidate does not connect to each other, and
  said each link candidate and any other link candidate in the second set of link candidates are not on the same straight line;
when the second set includes a plurality of acquired combinations of link candidates, generating, from the second set of link candidates, a third set of link candidates, wherein, when the second set of link candidates includes a plurality of link candidates, the third set of link candidates includes a pair of link candidates in the second set of link candidates that are the closest and the next closest to the position information of the pedestrian walking at the location;
determining, based on the third set of link candidates, walking route data of the walking route of the pedestrian walking at the location; and
transmitting the walking route data to an application configured to display the walking route.

6. The walking route determination device according to claim 2, the method further comprising:
  determining, as the movement direction of the pedestrian, a direction that matches with a measured trajectory of the pedestrian among a forward direction and a backward direction of a direction of a link candidate for the walking route network that is closest to the position information of the pedestrian.

7. The walking route determination device according to claim 2, the method further comprising:
  calculating, when a combination of link candidates that are not on the same straight line are acquired, a sum of inner products of unit vectors $\vec{A}$, $\vec{B}$, $\vec{C}$, $\vec{D}$ of vectors, which connect both end points of one link candidate to both end points of the other link candidate among the combination of link candidates, respectively, and a unit vector $\vec{L}$ of the one link candidate; and
  determining that the combination of link candidates are not on the same straight line when the calculated sum of inner products is smaller than a threshold value.

8. The walking route determination device according to claim 3, the method further comprising:
  calculating, when a combination of link candidates that are not on the same straight line are acquired, a sum of inner products of unit vectors $\vec{A}$, $\vec{B}$, $\vec{C}$, $\vec{D}$ of vectors, which connect both end points of one link candidate to both end points of the other link candidate among the combination of link candidates, respectively, and a unit vector $\vec{L}$ of the one link candidate; and
  determining that the combination of link candidates are not on the same straight line when the calculated sum of inner products is smaller than a threshold value.

9. The walking route determination method according to claim 5, the method further comprising:
  determining, as the movement direction of the pedestrian, a direction that matches with a measured trajectory of the pedestrian among a forward direction and a backward direction of a direction of a link candidate for the walking route network that is closest to the position information of the pedestrian.

10. The walking route determination method according to claim 5, the method further comprising:
  calculating, when a combination of link candidates that are not on the same straight line are acquired, a sum of inner products of unit vectors $\vec{A}$, $\vec{B}$, $\vec{C}$, $\vec{D}$ of vectors, which connect both end points of one link candidate to both end points of the other link candidate among the combination of link candidates, respectively, and a unit vector $\vec{L}$ of the one link candidate; and
  determining that the combination of link candidates are not on the same straight line when the calculated sum of inner products is smaller than a threshold value.

11. The walking route determination method according to claim 9, the method further comprising:
  calculating, when a combination of link candidates that are not on the same straight line are acquired, a sum of inner products of unit vectors $\vec{A}$, $\vec{B}$, $\vec{C}$, $\vec{D}$ of vectors, which connect both end points of one link candidate to both end points of the other link candidate among the combination of link candidates, respectively, and a unit vector $\vec{L}$ of the one link candidate; and
  determining that the combination of link candidates are not on the same straight line when the calculated sum of inner products is smaller than a threshold value.

\* \* \* \* \*